US010179579B2

United States Patent
Didwiszus et al.

(10) Patent No.: US 10,179,579 B2
(45) Date of Patent: Jan. 15, 2019

(54) VALVE ARRANGEMENT

(71) Applicant: WABCO GmbH, Hannover (DE)

(72) Inventors: Lars Didwiszus, Hannover (DE); Hartmut Schappler, Hannover (DE); Dieter Steinfeld, Hannover (DE)

(73) Assignee: WABCO GMBH, Hannover (DE)

( * ) Notice: Subject to any disclaimer, the term of this patent is extended or adjusted under 35 U.S.C. 154(b) by 78 days.

(21) Appl. No.: 15/310,806

(22) PCT Filed: May 22, 2015

(86) PCT No.: PCT/EP2015/001052
§ 371 (c)(1),
(2) Date: Nov. 14, 2016

(87) PCT Pub. No.: WO2015/192937
PCT Pub. Date: Dec. 23, 2015

(65) Prior Publication Data
US 2017/0080912 A1 Mar. 23, 2017

(30) Foreign Application Priority Data
Jun. 21, 2014 (DE) .................. 10 2014 009 179

(51) Int. Cl.
*B60T 13/68* (2006.01)
*B60T 15/02* (2006.01)
(Continued)

(52) U.S. Cl.
CPC .......... *B60T 13/683* (2013.01); *B60T 15/027* (2013.01); *B60T 15/18* (2013.01); *B60T 15/54* (2013.01)

(58) Field of Classification Search
CPC ........ B60T 13/683; B60T 15/54; B60T 15/18; B60T 15/027
(Continued)

(56) References Cited

U.S. PATENT DOCUMENTS

| 4,915,458 A * | 4/1990 | Deike ..................... B60T 8/342 137/627.5 |
| 6,206,481 B1 * | 3/2001 | Kaisers ................... B60T 8/327 303/118.1 |

(Continued)

FOREIGN PATENT DOCUMENTS

| CN | 103068647 A | 4/2013 |
| DE | 3722306 A1 | 1/1989 |

(Continued)

*Primary Examiner* — Thomas J Williams
(74) *Attorney, Agent, or Firm* — Leydig, Voit & Mayer, Ltd.

(57) ABSTRACT

A valve arrangement for brake control of a vehicle braking system which is operated using pressure medium includes a relay valve arranged in a housing, and a solenoid valve configured for controlling the relay valve. The relay valve has an axially displaceable relay valve piston with a first annular sealing seat configured to be acted on with a control pressure which is directed into a control pressure chamber and which can be adjusted by the solenoid valve, having an axially displaceable plate valve having a radial sealing face, and having an insert secured to the housing which separates an operating chamber from a pressure chamber and which has a second annular sealing seat which is arranged coaxially relative to the first annular sealing seat of the relay valve piston. The first and second annular sealing seats cooperate simultaneously or alternately with the radial sealing face of the plate valve.

12 Claims, 4 Drawing Sheets

(51) Int. Cl.
*B60T 15/18* (2006.01)
*B60T 15/54* (2006.01)
(58) Field of Classification Search
USPC .................. 303/127, 7, 118.1, 119.1–119.3;
137/377, 625.64, 627.5
See application file for complete search history.

(56) References Cited

U.S. PATENT DOCUMENTS

| | | | |
|---|---|---|---|
| 6,792,971 B2 * | 9/2004 | Roether | B60T 15/027 |
| | | | 137/377 |
| 7,052,095 B2 * | 5/2006 | Roether | B60T 8/327 |
| | | | 303/119.2 |
| 7,059,688 B2 * | 6/2006 | Roether | B60T 13/683 |
| | | | 137/627.5 |
| 2013/0221735 A1 | 8/2013 | Kiel et al. | |

FOREIGN PATENT DOCUMENTS

| | | | |
|---|---|---|---|
| DE | 4226697 C1 * | 9/1993 | ............ B60T 15/027 |
| DE | 102007051150 A1 | 11/2008 | |
| DE | 102009029968 A1 | 12/2010 | |
| DE | 102009032313 A1 | 1/2011 | |
| DE | 102009040759 A1 | 3/2011 | |

* cited by examiner

VALVE ARRANGEMENT

CROSS REFERENCE TO RELATED APPLICATIONS

This application is a U.S. National Stage Application under 35 U.S.C. § 371 of International Application No. PCT/EP2015/001052 filed on May 22, 2015, and claims benefit to German Patent Application Nos. DE 10 2014 009 179.1 filed on Jun. 21, 2014. The International Application was published in German on Dec. 23, 2015 as WO 2015/192937 A1 under PCT Article 21(2).

FIELD

The invention relates to a valve arrangement for brake control of a vehicle braking system which is operated using pressure medium.

BACKGROUND

A pneumatic valve arrangement is disclosed in DE 10 2009 029 968 A1 by the same Applicant. In this valve arrangement, the insert which is secured to the housing and the plate valve are located in a lower housing portion and the relay valve piston is located coaxially relative thereto in an upper housing portion. This upper housing portion is connected to the lower housing portion in a sealed manner and has to be orientated in the most precise manner possible with respect to the coaxially arranged plate valve and the relay valve piston in order to ensure the functionality of the valve arrangement. The insert which is secured to the housing is sub-divided in the housing by means of a securing ring which is fixed in position in a groove in the lower housing portion.

The supply of control pressure to the operating chamber is carried out by means of obliquely extending holes or channels in the lower housing portion and in the upper housing portion. The ventilation of the operating chamber to the environment is carried out via a central hole in the relay valve piston and by means of a noise damper whose housing is fixed to the upper housing portion by means of a clip-fit connection. A first embodiment of the known valve arrangement comprises only one relay valve. Another embodiment of this valve arrangement has two relay valves which are arranged in a mirror-symmetrical and coaxial manner relative to each other. This latter embodiment with two relay valves may have in the ventilation path a noise damper to which both relay valves are connected, or each of the relay valves is connected to a separate noise damper. Each relay valve is acted on with control pressure by means of separate obliquely extending channels in the housing.

The relay valve or the two relay valves may supply at least one pneumatically actuatable brake cylinder of a pneumatically or electro-pneumatically actuatable braking system with compressed air. The control pressure may be a pressure which is controlled pneumatically, for example, by means of a brake pedal, controlled pressure or a pressure which is controlled electro-pneumatically, for example, by means of solenoid valves. The relay valve or the relay valves provide(s) the control pressure reinforced with quantities of air for the brake cylinder which, in response to an increase of the pressure, presses a brake lining against a brake disc which is arranged on a wheel shaft of a motor vehicle and consequently brakes the wheel or the motor vehicle. The relay valve in this instance shortens the response time of the brake or the period of time until the beginning of a braking operation by means of rapid air supply to the brake cylinder. In addition, the relay valve or relay valves enable(s) rapid ventilation of the brake cylinder(s).

This known valve arrangement has been proven to be advantageous in particular in terms of its operating method, but requires a complex processing of the compressed air channels which are constructed as oblique holes, a mechanical processing of the lower housing portion and the upper housing portion in all directions for a precise orientation of the upper housing portion with respect to the lower housing portion, in particular as a result of the arrangement of the relay valve piston running face in the upper housing portion and the remaining movable components in the lower housing portion so that the interfaces extend towards each other and have to be sealed. During assembly, there are different assembly directions so that the assembly, whether carried out by hand or by a machine, is complex and requires a relatively significant amount of time. Furthermore, the coupling of one or more solenoid valves which are required cannot readily be standardised in such a manner that different solenoid valve units from different manufacturers can be coupled to the relay valve component. Finally, there is also limited flexibility for construction of variants, for example, for single-channel systems or dual-channel systems, which may or may not be provided with redundancy connections and which enable a complete circuit separation.

Redundancy connections are required for safety reasons when the valve arrangement is controlled by means of an electronic motor control unit. In this instance, in the event of a failure of the electronic motor control unit, a redundancy pressure which is supplied by a pedal-controlled brake value transmitter is supplied directly to the relay valve(s).

SUMMARY

In an embodiment, the present invention provides a valve arrangement for brake control of a vehicle braking system which is operated using pressure medium. The valve arrangement includes a relay valve arranged in a housing, and a solenoid valve configured for controlling the relay valve. The relay valve has an axially displaceable relay valve piston with a first annular sealing seat configured to be acted on with a control pressure which is directed into a control pressure chamber and which can be adjusted by the solenoid valve, having an axially displaceable plate valve having a radial sealing face, and having an insert secured to the housing which separates an operating chamber from a pressure chamber and which has a second annular sealing seat which is arranged coaxially relative to the first annular sealing seat of the relay valve piston. The first and second annular sealing seats cooperate simultaneously or alternately with the radial sealing face of the plate valve in such a manner that, when control pressure is applied, a storage pressure from the pressure chamber reaches the operating chamber at the side of the relay valve piston which is remote from the control pressure chamber, and, when the control pressure is relieved, the pressure in the operating chamber is returned to a pressure medium container or is vented to the environment. The housing has at least one cylindrical receiving member which is closed at one side and which forms the control pressure chamber, the operating chamber, and the pressure chamber for arrangement of the relay valve piston, the insert which is secured to the housing and a carrier element for the plate valve which can be axially introduced into the receiving member in the sequence mentioned and fixed therein.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
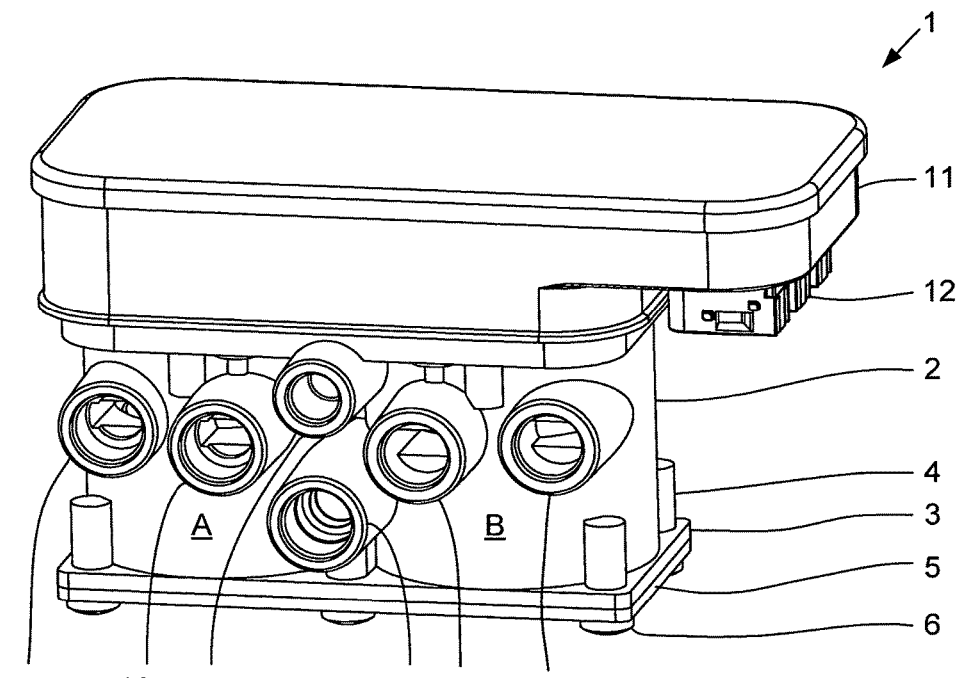
FIG. 1 is a perspective view of a valve arrangement which is constructed according to an embodiment of the invention.

Embodiments of the invention relate to a valve arrangement for brake control of a vehicle braking system which is operated using pressure medium, having at least one relay valve which is arranged in a housing and at least one solenoid valve for controlling the relay valve, wherein the relay valve has an axially displaceable relay valve piston with an annular sealing seat which can be acted on with a control pressure which is directed into a control pressure chamber and which is adjusted by means of the at least one solenoid valve, having an axially displaceable plate valve having a radial sealing face, and having an insert which is secured to the housing and which separates an operating chamber from a pressure chamber and which has an annular sealing seat which is arranged coaxially relative to the annular sealing seat of the relay valve piston, wherein the sealing seats mentioned cooperate simultaneously or alternately with the radial sealing face of the plate valve in such a manner that, when control pressure is applied, a storage pressure from the pressure chamber reaches the operating chamber at the side of the relay valve piston which is remote from the control pressure chamber, and, when the control pressure is relieved, the pressure in the operating chamber is returned to a pressure medium container or is vented to the environment.

An embodiment of the invention provides a valve arrangement, in particular for brake control of a vehicle braking system which is operated using a pressure medium, which has a reduced structural space, manages with a smaller number of components, leads to a simplified assembly with critical assembly processes being dispensed with and has a simple and clear interface between the relay valve component and a solenoid valve unit.

Accordingly, an embodiment of the invention provides a valve arrangement for brake control of a vehicle braking system which is operated using pressure medium, having at least one relay valve which is arranged in a housing and at least one solenoid valve for controlling the relay valve, wherein the relay valve has an axially displaceable relay valve piston with an annular sealing seat, which can be acted on with a control pressure which is directed into a control pressure chamber and which is adjusted by means of the at least one solenoid valve, having an axially displaceable plate valve having a radial sealing face, and having an insert which is secured to the housing and which separates an operating chamber from a pressure chamber and which has an annular sealing seat which is arranged coaxially relative to the annular sealing seat of the relay valve piston, wherein the sealing seats mentioned cooperate simultaneously or alternately with the radial sealing face of the plate valve in such a manner that, when control pressure is applied, a storage pressure from the pressure chamber reaches the operating chamber at the side of the relay valve piston which is remote from the control pressure chamber, and, when the control pressure is relieved, the pressure in the operating chamber is returned to a pressure medium container or is vented to the environment.

In an embodiment of the invention, there is provision for the housing to have at least one cylindrical receiving member which is closed at one side and which forms the control pressure chamber, the operating chamber and the pressure chamber for arrangement of the relay valve piston, the insert which is secured to the housing and a carrier element for the plate valve which can be axially introduced into the receiving member in the sequence mentioned and fixed therein.

As a result of this arrangement, there is only one assembly direction for the elements of the relay valve, whereby the assembly of the valve arrangement is simplified. There are further necessary no critical production processes, such as, for example, the insertion of securing rings by means of a securing ring press, and the necessary structural space can be kept comparatively small which leads to a saving of weight. Furthermore, the number of necessary components is reduced in comparison with known valve arrangements.

A simple and clear interface from the relay valve to a solenoid valve unit can be achieved in that the at least one solenoid valve is arranged on the housing at the closed side of the receiving member for the relay valve piston, the insert and the carrier element for the plate valve and in that connection channels between the at least one solenoid valve and the at least one relay valve, between the at least one solenoid valve and a storage pressure connection and between the at least one solenoid valve and a pressure relief region, for example, towards a noise damper, extend in the housing in a substantially axially parallel manner or perpendicularly relative to the longitudinal axis of the pot-like receiving member for the relay valve piston, the insert and the carrier element.

There are thereby produced a pressure transfer from the solenoid valve unit to the relay component in the longitudinal axial direction directly via the relay component and a simple sealing geometry in the form of an axial seal to the solenoid valve unit. The solenoid valves can be arranged independently of the position of the functional regions in the relay component by a correspondingly adapted pressure distribution plate being arranged between the solenoid valve unit and the relay component. The at least one or more solenoid valves can thereby be arranged both perpendicularly to and parallel with the pressure transfer plane.

The relay portion components, such as relay valve piston, plate valve and insert which is secured to the housing, can be combined as pre-assembly structural components and can be inserted as a unit into the pot-like receiving member which is provided in the housing and they do not need to be axially secured by means of a securing ring.

The housing can be produced as a die-cast component of metal or as an injection-moulded component of plastics material and enables the use of simple shaping tools by means of significantly simplified die-casting or injection-moulding geometries. The mechanical processing which may still be necessary is significantly reduced and simplified, as is the assembly of the valve arrangement according to an embodiment of the invention. As a result of the more compact construction shape, there is a reduction of the control air volumes, which leads to a better and more rapid control of the relay valve. The pressure relief or the pressure ventilation of the solenoid valve unit and the at least one relay valve are completely separated from each other so that they do not influence each other and additionally a reduced noise development should be mentioned.

It is particularly advantageous for the at least one solenoid valve and the at least one relay valve to be able to have separate channels for the supply of control pressure and the relief of control pressure, whereby no mutual influence can occur.

Since the pot-like receiving member for the relay valve piston, the plate valve and the insert which is secured to the housing is opened from only one side before the assembly, it can also be closed in the simplest manner by means of a sieve plate, which fixes the mentioned elements of the relay valve in the receiving member and permits the passage of the compressed air, in the event of pressure relief, when a pneumatic valve arrangement is involved. The sieve plate may be screwed to the housing or it may be inserted transversely relative to the receiving member into a slot in the housing, after which the sieve plate can either be fixed in the slot by means of at least one fixing screw or the sieve plate has a catch projection which engages behind a slot delimitation in the inserted state of the sieve plate.

When a sieve plate is used in the above-mentioned embodiments, the carrier element may have a receiving space for a noise damper which may comprise a knitted or interwoven fabric or a fleece of plastics material and/or metal threads, wherein the noise damper may be adhesively bonded in the receiving space or may also only be inserted and then fixed in the position thereof by means of the sieve plate.

Alternatively, the receiving member with the inserted relay valve piston, the insert and the carrier element may be closed so as to be able to be releasably connected to the housing of the valve arrangement by means of a noise damper which is arranged in a housing so that the relay valve elements which are introduced into the receiving member are thereby fixed.

An embodiment of the invention provides a vehicle, in particular a utility vehicle, which has at least one valve arrangement with the features defined above.

A further embodiment of the invention provides for the use of at least one valve arrangement which is constructed as an axle modulator or an electronic air preparation device or an electromagnetic parking brake device in accordance with the features defined above in a compressed air system of a vehicle.

FIG. 1 accordingly shows a valve arrangement 1 according to an embodiment of the invention. The valve arrangement 1 has a two-channel valve system with a region A for a first channel and a region B for a second channel which are combined in a common housing 2. The housing 2 is provided with a flange 3 to which a sieve plate 5 is fixed by means of six fixing screws 6. Since the regions A and B of the housing 2 are constructed in a substantially cylindrical manner, corresponding reinforcements 4 with threaded holes are arranged on the flange for receiving the six fixing screws 6. The housing 2 has substantially centrally a connection 7 for storage pressure, a connection 8 for redundancy pressure axially thereabove and laterally with respect thereto at each of the regions A and B a first outlet 9a; 9b and a second outlet 10a; 10b for brake pressure, respectively, which are connected to the wheel brakes of a vehicle axle in each case by means of lines which are not illustrated.

A solenoid valve unit 11 and an electronic module 33 are arranged at the upper side of the housing 2, wherein the module 33 is connected by means of electrical plug type connections 12 and a line which is not illustrated to a motor control unit which is not shown. The electronic module 33 is in this instance arranged above the solenoid valves 14, 18, 23 and is pressed onto the solenoid valves 14, 18, 23 and the electrical plug type connections 12 when it is assembled. Inside the solenoid valve unit 11 there is arranged a solenoid valve block 13 which is shown in FIG. 2 as a sectioned illustration.

The solenoid valve block 13 has a first solenoid valve 14 which receives corresponding storage pressure from a pressure container which is not illustrated via the connection 7 for storage pressure, a connection channel 29 for storage pressure and an inlet channel 15, and supplies this storage pressure in a state modulated in a cyclical manner via a first outlet channel 16 and a second outlet channel 17 for control pressure in each case to a relay valve 72 which is arranged in the region A or in the region B.

Figure 5:
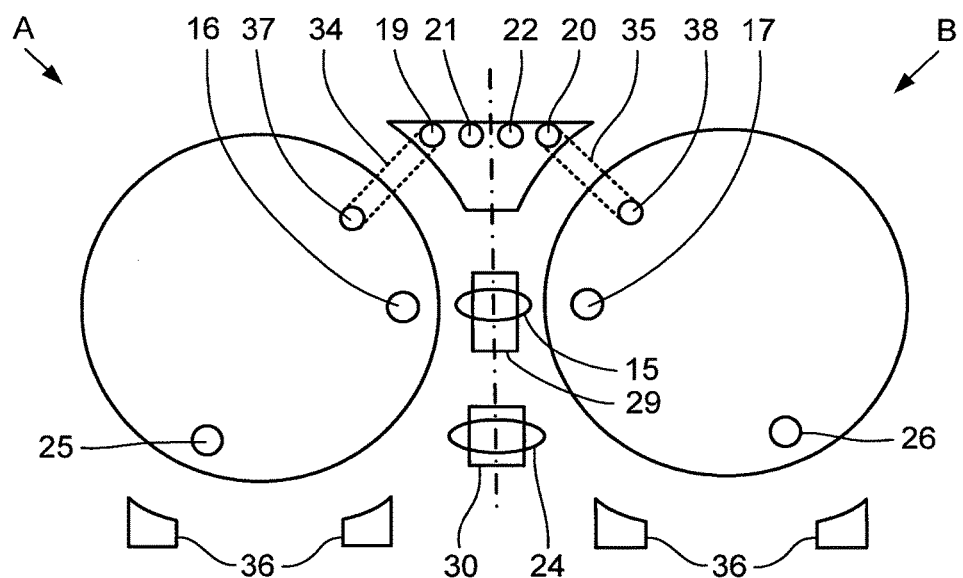
FIG. 5 is a schematic illustration of an arrangement of the channels between the solenoid valves and the relay valves according to an embodiment of the invention.

A second solenoid valve 18 which is arranged parallel with the first solenoid valve 14 serves to ventilate in a controlled manner the control pressure which is introduced into the relay valve 72. To this end, the second solenoid valve 18 has a first inlet 19 and a second inlet 20 which are connected by means of a first oblique control pressure channel 34 and a second control pressure channel 35 to a first control pressure opening 37 and a second control pressure opening 38 of the relay valves 72 in the regions A and B, respectively (FIG. 5).

Figure 2:
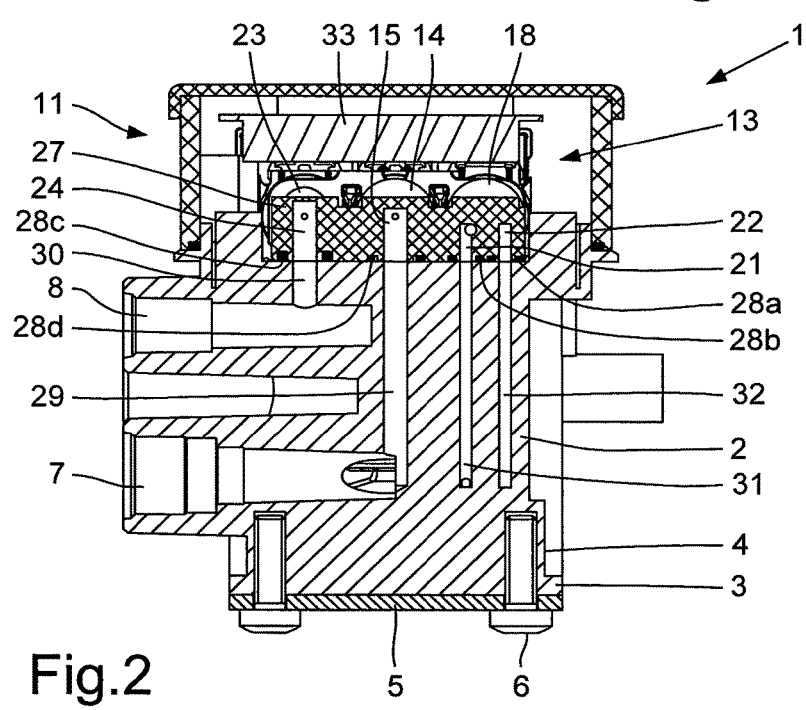
FIG. 2 is a sectioned view through the valve arrangement according to FIG. 1.

The second solenoid valve 18 cyclically controls the ventilation of the control pressure from the relay valves 72 by opening or closing a connection between the first inlet 19 to the second solenoid valve 18 and the first outlet 21 of the second solenoid valve 18 or between the second inlet 20 of the second solenoid valve 18 and the second outlet 22 of the second solenoid valve 18, whereby control pressure reaches a ventilation region of the valve arrangement 1 via first and second outlet channels 31, 32 in the housing 2 which are illustrated in FIG. 2.

A third parallel solenoid valve 23 receives redundancy pressure which, via the connection 8 for redundancy pressure and a connection channel 30 reaches an inlet channel 24 for redundancy pressure of the third solenoid valve 23. The third solenoid valve 23 directs the redundancy pressure in a controlled manner via a first outlet 25 and via a second outlet 26 to the relay valves 72 in the regions A and B of the valve arrangement 1.

The mentioned channels 15, 16, 17, 16, 24 and the inlets 19, 20 and the outlets 21, 22 are arranged centrally in a distributor housing 27. The environment of these channels, and that of the outlets 25, 26 for redundancy pressure, are processed to be smooth in a plane and have annular grooves for receiving sealing rings 28a, 28b, 28c, as shown in FIG. 2.

The three solenoid valves 14, 18, 23 with the distributor housing 27 and the regions of the outlets 25, 26 for redundancy pressure are pressed in an appropriate manner against the housing 2 of the valve arrangement 1 and positioned and fixed with respect to the channels 29, 30, 31, 32 and another channel which is not illustrated and which leads to the relay valves 72 in the regions A and B of the valve arrangement 1. The distributor housing 27 can to this end be securely screwed directly to the housing 2 by means of screws which are not illustrated.

At the outlets 9, 10 in the regions A and B of the valve arrangement 1, as illustrated in FIG. 5, pressure sensor connections 36 for pressure sensors which are not illustrated may be provided.

Figure 4:
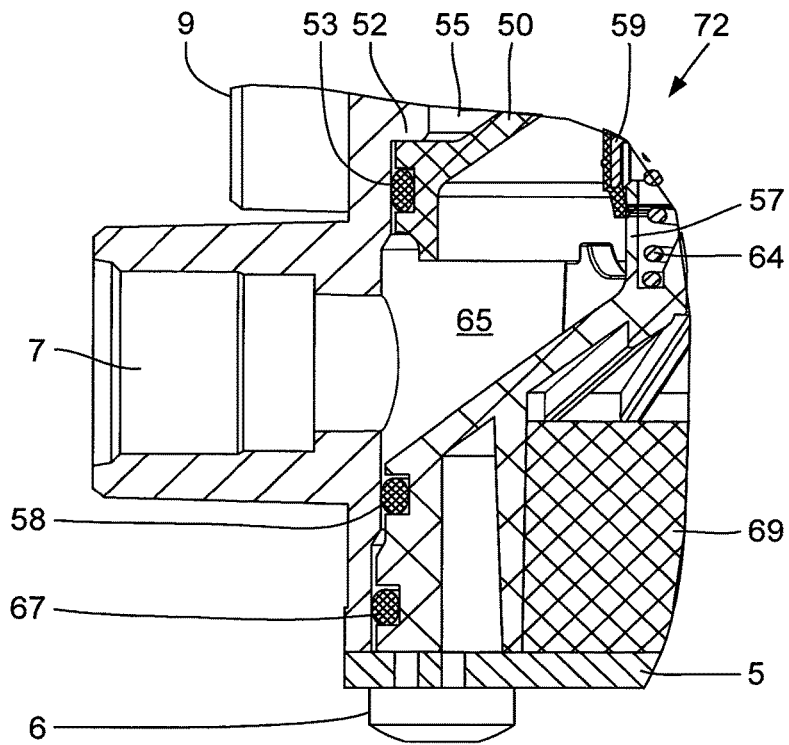
FIG. 4 is a part-section through the valve arrangement according to FIG. 1 in the region of a relay valve, in a state rotated through 90° with respect to FIG. 3.
Figure 3:
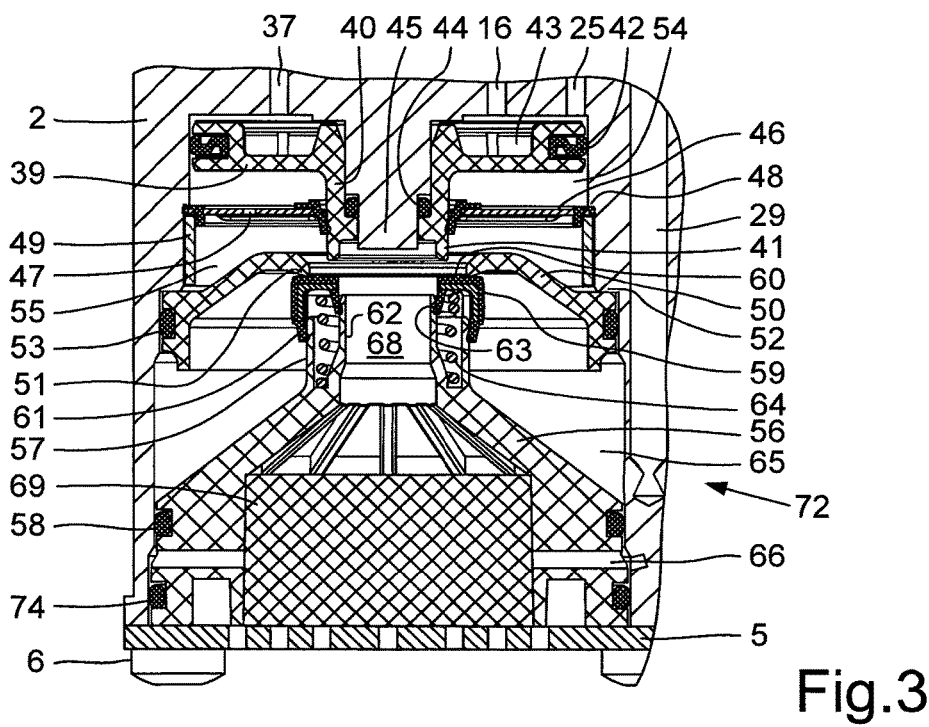
FIG. 3 is a part-section of the valve arrangement according to FIG. 1 in the region of a relay valve.

FIGS. 3 and 4 show the construction of a relay valve 72, of which one is provided for each channel in the regions A and B of the valve arrangement 1, respectively.

In the housing 2, in each region A and B a space is provided for receiving the structural elements for a relay valve 72. These structural elements comprise a relay valve piston 39, a baffle plate 46, an insert 50, a plate valve 59, a carrier element 56 and a noise damper 69. The insert 50 is constructed radially inwardly as a valve seat for the plate valve 59 and preferably produced from a plastics material which reduces the overall weight and the production costs of the relay valve 72 in comparison with a metal construction.

The relay valve piston 39 is guided on a centrally arranged cylindrical guiding journal 45 of the housing 2 by means of a hollow-cylindrical guiding portion 40. The relay piston 39 is guided so as to be sealed with respect to the housing 2 by means of a Z-sealing ring 42 and with respect to the cylindrical guiding journal 45 by means of a sealing ring 44.

Between an upper side of the relay valve piston 39 and the housing 2 there is formed a control pressure chamber 43 to which there is supplied via the first solenoid valve 14 storage pressure which has been modulated in a cyclical manner to form a control pressure via the first outlet channel 16. The additional, first outlet 25 of the third solenoid valve 23 serves to supply or discharge redundancy pressure to/from the control pressure chamber 43. The first control pressure opening 37 serves to ventilate the control pressure from the control pressure chamber 43, if necessary.

In a state axially spaced apart from the relay valve piston 39, there is arranged a baffle plate 46 which is sealed with respect to the hollow-cylindrical guide 40 of the relay valve piston 39 by means of a sealing means which is not described in greater detail and which is securely in abutment with a first step 48 in the housing 2.

Via a pressure compensation hole 47 there is produced a pressure compensation between an upper chamber 54 and a lower chamber 55 which together form an operating chamber. The baffle plate 46 serves to damp the movement of the relay valve piston 39 since air from the upper chamber 54 can only reach the lower chamber 55 through the pressure compensation hole 47 when the relay valve piston 39 moves downwards when the control pressure chamber 43 is acted on with pressure or moves upwards again in the lower chamber 55 in the event of a pressure increase. The baffle plate 46 consequently counteracts excess pivoting of the relay valve piston 39 and shortens an inward pivoting operation during control of the pressure which, for example, is supplied to the brakes of a vehicle via the outlets 9, 10 in accordance with the control pressure in the control pressure chamber 43. When a damping of the movement of the relay valve piston 39 is not required, the baffle plate 46 can be dispensed with.

The baffle plate 46 is retained against the first step 48 in the housing 2 by means of a support cylinder 49 which is supported, on the one hand, on the insert 50 and, on the other hand, on the baffle plate 46. However, the support cylinder 49 may also be a direct component of the insert 50, that is to say, may be produced in an integral and materially engaging manner therewith.

The operating chamber which is formed by the upper chamber 54 and the lower chamber 55 is separated from a pressure chamber 65 in the lower region of the housing 2 by means of the insert 50. This insert 50 radially abuts at the outer side a second step 52 in the housing 2 and is sealed with respect to the housing 2 by means of a sealing ring 53. The insert 50 has at a radially inner side an annular sealing seat 51 with which a radially outer region of a radial sealing face 60 of a plate valve 59 is in abutment.

A radially inner region of the radial sealing face 60 cooperates with an annular sealing seat 41 at the end of the hollow-cylindrical guide 40 when the relay valve piston 39 as a result of the supply of control pressure is lowered with the annular sealing seat 41 thereof onto the radial sealing face 60 of the plate valve 59.

The plate valve 59 is arranged coaxially with respect to the relay valve piston 39 in the housing 2 and guided counter to the pressure of a pressure spring 64 on a hollow-cylindrical guide 57 and a coaxial hollow-cylindrical extension 62 by means of two associated sealing lips 61 and 63, respectively. The cylindrical guide 57 and the cylindrical extension 62 are components of the carrier element 56 which terminates the relay valve 72 at the bottom and which is accordingly sealed with respect to the housing 2 by means of sealing rings 58 and 67.

Between the insert 50 and the carrier element 56 there is formed an annular pressure chamber 65 which is acted on via the connection 7 with storage pressure from a storage container which is not illustrated. The connection channel 29 for storage pressure, which is illustrated in FIG. 2, is illustrated in FIG. 3 at the side of the relay valve 72 since the sectioned illustration of FIG. 3 is rotated through 90° with respect to the sectioned illustration in FIG. 2.

The inner region of the cylindrical extension 62 forms a ventilation hole 68 for the operating chamber which is formed by the upper chamber 54 and the lower chamber 55 and which merge into an expanded space in the carrier element 56, in which a noise damper 69 in the form of a damping fleece or a knitted damping material of plastics fibres and/or metal threads is arranged in a receiving space 74. The air which is discharged from the outlet channels 31, 32 and which originates from the second solenoid valve 18 is also supplied to this noise damper 69 via radial ventilation channels 66. The housing 2 is terminated at the bottom by means of the sieve plate 5 which has already been mentioned and which is secured to the housing 2 by means of the fixing screws 6.

This sieve plate 5 defines the axial position of the carrier element 56 which is pressed against the sieve plate 5 by means of the storage pressure in the pressure chamber 65.

The position of the insert 50 is determined by means of a second step 52 in the housing 2, against which step the insert 50 is also pressed by means of the storage pressure in the pressure chamber 65.

The position of the baffle plate 46 is determined by the first step 48 in the housing 2, against which step the baffle plate 46 is pressed by the support cylinder 49 and the insert 50.

The operating method of the relay valve 72 is the same as that of the relay valve described in DE 10 2009 029 968 A1. When control pressure, modulated in a cyclical manner by the first solenoid valve 14, reaches the control pressure chamber 43 via the first outlet channel 16, the relay valve piston 39 moves in an axially downward direction and the annular sealing seat 41 thereof is positioned on the radial sealing face 60 of the plate valve 59 and displaces the plate valve 59 counter to the pressure of the pressure spring 64 so that it lifts off from the annular sealing seat 51 on the insert 50. A connection between the pressure chamber 65 for storage pressure and the operating chamber formed by the upper chamber 54 and the lower chamber 55 below the relay valve piston 39 is thereby opened so that the pressure at that location increases until the relay valve piston 39 is urged back upwards again and the radial sealing face 60 of the plate valve 59 is again in abutment against the annular sealing seat 51 on the insert 50. The pressure in the operating chamber formed by the upper chamber 54 and the lower chamber 55 is a function of the pressure in the control pressure chamber 43 and reaches via the outlets 9, 10 and corresponding lines brake wheels of a vehicle axle which are not illustrated. This brake pressure increases when the pressure in the control pressure chamber 43 is increased via the first outlet channel 16 by the connection between the pressure chamber 65 and the operating chamber formed by the upper chamber 54 and the lower chamber 55 being opened again until there is again pressure equilibrium between the control pressure chamber 43 and the operating chamber formed by the upper chamber 54 and the lower chamber 55. Conversely, the brake pressure can be reduced by control pressure from the control pressure chamber 43 being discharged via the first outlet 25 of the second solenoid valve 18.

The supply of the control pressure via the first outlet 16 to the control pressure chamber 43 is controlled by the first solenoid valve 14 which is acted on with storage pressure by means of the inlet channel 15, whilst the ventilation of the control pressure chamber 43 is carried out by the second solenoid valve 18 via the first control pressure opening 37 in the housing 2, the first control pressure channel 34 to the first inlet 19 to the second solenoid valve 18 in the distributor housing 27 and from there, in a state controlled by the second solenoid valve 18, to the first outlet 21 of the second solenoid valve 18 and onwards to the first outlet channel 31 in the housing 2 and from there via the radial ventilation channel 6 to the noise damper 69. Whilst with conventional valve arrangements for brake control of a vehicle the air supply and the ventilation of the control chamber are carried out through the same hole, as a result of the above-described separation of the air supply and ventilation, the cross-section of the air supply and ventilation holes to the control chamber may be different in order, for example, thus to optimise the control accuracy of the valve arrangement.

For safety reasons, the relay valve 72 can be controlled directly by the so-called redundancy pressure if the electronic control fails. In this instance, the third solenoid valve 23 for redundancy pressure opens a connection from the inlet channel 24 for redundancy pressure to the first outlet 25 and for the second outlet 26 of the third solenoid valve 23 for redundancy pressure to the control pressure chamber 43 so that the relay valve piston 39 is controlled by the redundancy pressure which, for example, can originate from a pedal-actuated brake value sensor which is not illustrated. In the event of failure of the engine control unit, three solenoid valves 14, 18, 23 are not supplied with power and the two solenoid valves 14, 18 remain in a switching position in which the connection between the channels 15, 16, 17 of the first solenoid valve 14 and the channels 19, 20, 21, 22 of the second solenoid valve 18 are separated from each other, whilst, if the third solenoid valve 23 is not supplied with power, the connection between the inlet channel 24 for redundancy pressure and the outlets 25, 26 of the third solenoid valve 23 are opened.

Figure 6:
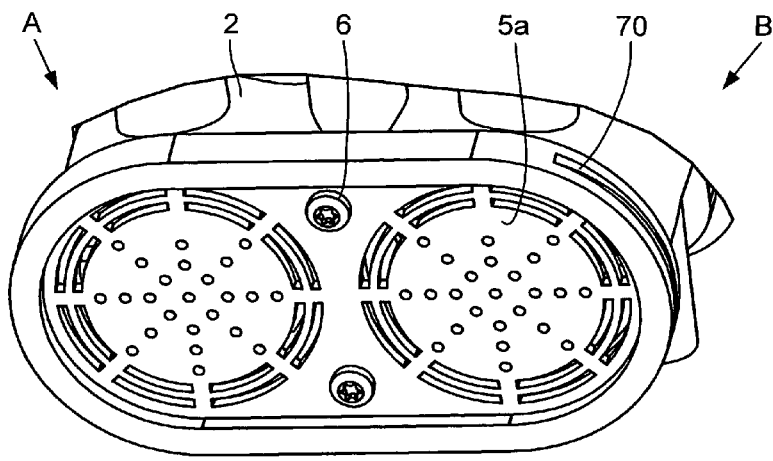
FIG. 6 is a perspective bottom view of the valve arrangement with a second embodiment of a sieve plate according to an embodiment of the invention.

FIG. 6 shows a second embodiment of a sieve plate 5a which is inserted through a lateral slot 70 into the housing 2 and is fixed in the illustrated position by means of two fixing screws 6.

Figure 7:
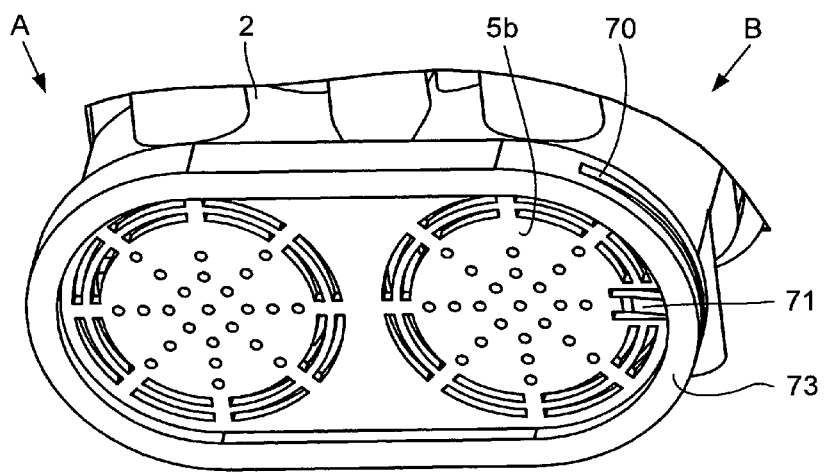
FIG. 7 is a perspective bottom view of the valve arrangement with a third embodiment of a sieve plate according to an embodiment of the invention.

It is possible to dispense with the two fixing screws 6 when a sieve plate 5b which is illustrated in FIG. 7 is provided with a catch projection 71, which, after the sieve plate 5b is inserted through the slot 70, engages behind a slot delimitation 73 and thus fixes the sieve plate 5b in the illustrated position.

In place of integrating the noise damper 69 in the carrier element 56 and fixing the elements of the relay valve 72 through the sieve plate 5, 5a, 5b in the housing 2, it is also possible to use a noise damper as illustrated and described in DE 10 2009 029 968 A1 and to construct the housing 2 for receiving such a noise damper in accordance with this specification. Details of such a noise damper and the arrangement on the housing 2 of the valve arrangement 1 can be taken from this specification, whose content in this regard is incorporated completely in the subject-matter of the disclosure so that drawings of this noise damper and the adaptation of the housing are not required in this instance.

If only a single-channel version is required by the valve arrangement 1 according to an embodiment of the invention so that only one relay valve 72 also has to be accommodated in the housing 2, it is possible to dispense with the region B of the housing 2 so that the housing 2 has only the region A with a connection 7 for the storage pressure, a connection 8 for the redundancy pressure and the outlets 9, 10 to elements of a braking system of a vehicle which is operated with pressure medium. The solenoid valve unit 11 is also accordingly halved and reduced in size since only one relay valve 72 has to be supplied with control pressure and redundancy pressure and also only half the number of ventilation channels is required.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS
(COMPONENT OF THE DESCRIPTION)

1 Valve arrangement
2 Housing
3 Flange
4 Reinforcement with threaded hole
5 Sieve plate
5a Sieve plate
5b Sieve plate
6 Fixing screws
7 Connection for storage pressure
8 Connection for redundancy pressure
9a, 9b First outlet for brake pressure
10a, 10b Second outlet for brake pressure
11 Solenoid valve unit
12 Electrical plug type connection
13 Solenoid valve block
14 First solenoid valve
15 Inlet channel for storage pressure
16 First outlet channel for control pressure
17 Second outlet channel for control pressure
18 Second solenoid valve
19 First inlet to the solenoid valve 18
20 Second inlet to the solenoid valve 18
21 First outlet from the solenoid valve 18
22 Second outlet from the solenoid valve 18
23 Third solenoid valve for redundancy pressure
24 Inlet channel for redundancy pressure
25 First outlet of the solenoid valve 23
26 Second outlet of the solenoid valve 23
27 Distributor housing
28a Sealing ring
28b Sealing ring
28c Sealing ring
28d Sealing ring
29 Connection channel for storage pressure
30 Connection channel for redundancy pressure
31 First outlet channel in the housing 2
32 Second outlet channel in the housing 2
33 Electronic module
34 First oblique control pressure channel
35 Second oblique control pressure channel
36 Pressure sensor connection
37 First control pressure opening
38 Second control pressure opening
39 Relay valve piston
40 Hollow-cylindrical guiding portion on the relay valve piston
41 Annular sealing seat
42 Z-sealing ring
43 Control pressure chamber
44 Sealing ring
45 Cylindrical guiding journal
46 Baffle plate
47 Pressure compensation hole
48 First step in the housing 2
49 Support cylinder
50 Insert
51 Annular sealing seat
52 Second step in the housing 2
53 Sealing ring
54 Upper chamber
55 Lower chamber
56 Carrier element
57 Cylindrical guide
58 Sealing ring
59 Plate valve
60 Radial sealing face
61 Sealing lip on the cylindrical guide 57
62 Coaxial, cylindrical extension
63 Sealing lip on the cylindrical extension 62
64 Pressure spring
65 Pressure chamber for storage pressure
66 Radial ventilation channel
67 Sealing ring
68 Ventilation hole
69 Noise damper
70 Slot
71 Catch projection
72 Relay valve
73 Slot delimitation
74 Receiving space

The invention claimed is:

1. A valve arrangement for brake control of a vehicle braking system which is operated using pressure medium, the valve arrangement comprising:
a relay valve arranged in a housing; and
a solenoid valve configured for controlling the relay valve;
wherein the relay valve has an axially displaceable relay valve piston with a first annular sealing seat configured to be acted on with a control pressure which is directed into a control pressure chamber and which can be adjusted by the solenoid valve, having an axially displaceable plate valve having a radial sealing face, and having an insert secured to the housing which separates an operating chamber from a pressure chamber and which has a second annular sealing seat which is arranged coaxially relative to the first annular sealing seat of the relay valve piston,
wherein the first and second annular sealing seats cooperate simultaneously or alternately with the radial sealing face of the plate valve in such a manner that, when control pressure is applied, a storage pressure from the pressure chamber reaches the operating chamber at the side of the relay valve piston which is remote from the control pressure chamber, and, when the control pressure is relieved, the pressure in the operating chamber is returned to a pressure medium container or is vented to the environment,
wherein the housing has at least one cylindrical receiving member which is closed at one side and which forms the control pressure chamber, the operating chamber, and the pressure chamber for arrangement of the relay valve piston, the insert which is secured to the housing and a carrier element for the plate valve which can be axially introduced into the at least one cylindrical receiving member in the sequence mentioned and fixed therein.

2. The valve arrangement according to claim 1, wherein the solenoid valve is arranged on the housing at the closed side of the at least one cylindrical receiving member, and
wherein channels between the solenoid valve and the relay valve, between the solenoid valve and a connection for storage pressure, and between the at solenoid valve and a pressure relief region extend in the housing in a substantially axially parallel manner or perpendicularly relative to a longitudinal axis of the cylindrical receiving member.

3. The valve arrangement according to claim 1, wherein the solenoid valve and the relay valve have separate channels for the application of control pressure and the relief of control pressure.

4. The valve arrangement according to claim 1, wherein the at least one cylindrical receiving member is closed by a sieve plate.

5. The valve arrangement according to claim 4, wherein the sieve plate is screwed to the housing.

6. The valve arrangement according to claim 4, wherein the sieve plate is inserted transversely relative to the receiving member into a slot in the housing.

7. The valve arrangement according to claim 6, wherein the sieve plate is fixed in the slot by means of at least one fixing screw.

8. The valve arrangement according to claim 6, wherein the sieve plate has a catch projection which engages behind a slot delimitation in the inserted state of the sieve plate.

9. The valve arrangement according to claim 1, wherein the carrier element has a receiving space for a noise damper.

10. The valve arrangement according to claim 1, wherein the at least one cylindrical receiving member of the housing with the inserted relay valve piston, the insert, and the carrier element is closed by a noise damper which can be releasably connected to the housing of the valve arrangement.

11. A utility vehicle, comprising at least one valve arrangement according to claim 1.

12. A method of using at least one valve arrangement according to claim 1 which is constructed as an axle modulator or an electronic air preparation device or an electromagnetic parking brake device in a compressed air system of a vehicle.

* * * * *